XR 2,642,524
June 16, 1953 A. J. BAYLISS 2,642,524
RADIO COMMUNICATION SYSTEM
Filed Nov. 1, 1949
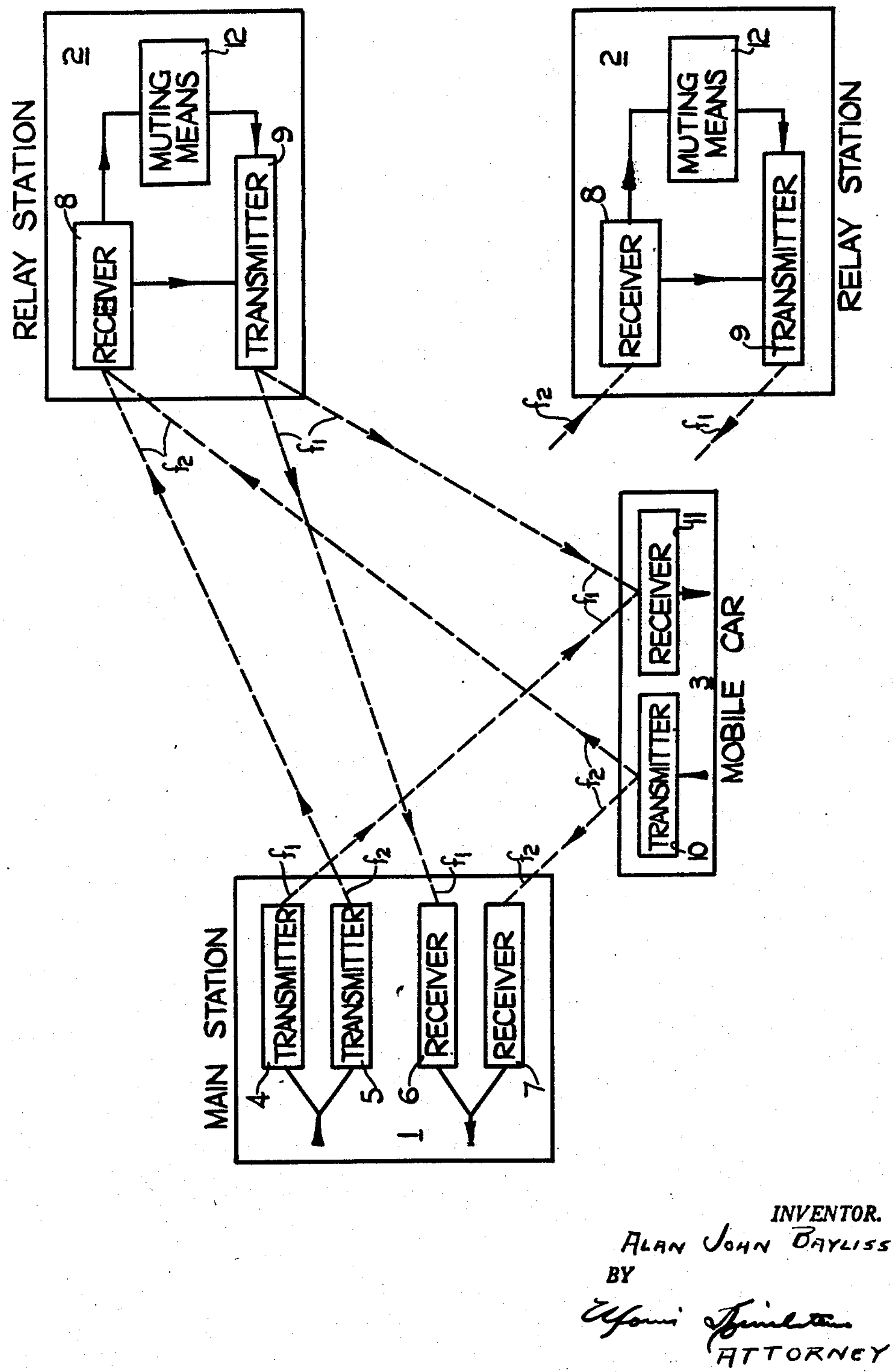
INVENTOR.
Alan John Bayliss
BY
[signature]
ATTORNEY Patented June 16, 1953 2,642,524

UNITED STATES PATENT OFFICE 2,642,524

RADIO COMMUNICATION SYSTEM

Alan John Bayliss, Wembley, England, assignor to The General Electric Company Limited, London, England Application November 1, 1949, Serial No. 124,744
In Great Britain November 4, 1948

5 Claims. (Cl. 250—6)

The present invention relates to radio communication systems. More particularly the invention relates to radio communication systems of the kind including a main station, at least one satellite relay station, and at least one mobile station, all of said stations being capable of transmitting and receiving radio signals. It is usual for the satellite relay station to be at least temporarily static.

Such systems are used, for example, where communication is required between the main station and a mobile station over an area greater than that which can be served satisfactorily by the main station, the relay station or stations being utilised to provide a radio link between the main and mobile stations when necessary. One particular use of such systems is for communication between a police headquarters and police patrol cars, whilst another use is for communication between a ground flying control station and an aircraft.

One object of the present invention is to provide an improved radio communication system of the kind specified.

According to the present invention, a radio communication system comprises a main station adapted to transmit radio frequency oscillations simultaneously at a first radio frequency and at a second radio frequency, both the said radio frequency oscillations being modulated with the same intelligence, the main station being also adapted to receive oscillations at said first and second radio frequencies, a relay station adapted to receive oscillations at said second radio frequency and to retransmit them at said first radio frequency, and a mobile station adapted to receive oscillations at said first radio frequency and to transmit oscillations at said second radio frequency, the arrangement being such that two-way simplex communication can be effected between said main station and said mobile station directly and/or via said relay station utilising radio frequency oscillations of only said first and second radio frequencies.

One arrangement according to the present invention as applied to a radio communication system of the kind specified will now be described, by way of example, with reference to the single figure of the accompanying drawing which shows the block layout of the system.

Referring now to the drawing, the system includes a static main station 1, a satellite relay station 2 and a number of mobile stations 3 (only one of which is shown in the drawing) in the form of suitably equipped motor cars. The main station 1 is equipped with two radio transmitters 4 and 5 adapted to transmit modulated radio frequency oscillations at frequencies $f_1$ and $f_2$ respectively, and with two radio receivers 6 and 7 adapted to receive oscillations at those frequencies respectively. The satellite relay station 2 is provided with a radio receiver 8 and radio retransmitting apparatus 9 whereby it is adapted to receive modulated oscillations at frequency $f_2$ and to retransmit similarly modulated oscillations at frequency $f_1$. Each of the cars 3 is provided with a transmitter 10 adapted to transmit oscillations at frequency $f_2$, and with a receiver 11 adapted to receive oscillations at frequency $f_1$. The distance apart of the main station 1 and the relay station 2 is such that the relay station 2 is outside of the service area of the main station 1, that is the area in which satisfactory communication can take place between the main station 1 and a car 3, but is such that satisfactory communication can take place between the main station 1 and the relay station 2. This latter requirement can be satisfied for a greater distance than that defined by the service area for a car, by the choice of a good site for the relay station 2 and/or the use of a more sensitive receiver and more efficient aerial system than is practicable in the case of a car.

The operation of the system is as follows. When the main station 1 desires to communicate with a car 3 both transmitters 4 and 5 are simultaneously modulated with the desired intelligence. Assuming now that the car 3 is within the service area of the main station 1, it will receive oscillations at the frequency $f_1$ transmitted from the main station 1, and it will also receive oscillations of the same frequency retransmitted from the relay station 2 as a consequence of the receipt by the relay station 2 of oscillations, at the frequency $f_2$, transmitted from the main station 1. Both the directly-received and the relayed oscillations are modulated with the desired intelligence. When the car 3 wishes to communicate with the main station 1, it will transmit oscillations at the frequency $f_2$ modulated with the desired intelligence, which oscillations will be received both by the receiver 7 at the main station 1 and by the relay station 2. The relay station 2 upon receipt of the oscillations at the frequency $f_2$ will retransmit the desired intelligence at the frequency $f_1$ which will be received by the receiver 7 at the main station 1.

If, however, the car 3 is not within the service area of the main station 1 but is within the service area of the relay station 2, it can still communicate with the main station 1 via the relay station 2. Since the transmitters 4 and 5 are modulated simultaneously and the outputs of the receivers 6 and 7 are mixed, the car 3 may move between the service areas of the main station 1 and of the relay station 2 yet maintain communication with the main station 1 without any changeover being effected by an operator at any of these stations.

It will be understood that the invention is not limited to the use of only one relay station 2, but that a number of such relay stations may be used to increase the service area, each relay station 2 being in direct radio communication with the main station 1. Two spaced relay stations 2 are in fact shown in the accompanying drawing. It is desirable to provide signal controlled muting means 12 at the relay stations 2 whereby only received oscillations above a predetermined strength are retransmitted to the main station. The reason for this is that a car 3 may be at a relatively great distance from one relay station 2 whilst being comparatively close to another, and it is undesirable that the strong signal received at the main station 1 via the latter relay station should be degraded by the noise which would normally accompany the weak signal received via the former relay station. Preferably the oscillations retransmitted by the relay station or stations are synchronised or locked in frequency with respect to received oscillations, for example in the manner described in the complete specification of British Patent No. 610,532. The desired intelligence may be conveyed by frequency or amplitude modulation.

It will be appreciated that a system according to the present invention is comparatively simple and is economical in apparatus by reason of the fact that only two different frequencies are utilized. Furthermore the fact that all communications are retransmitted from a relay station at a frequency to which the car receivers are responsive means that car-to-car communication can take place via a relay station even though the cars are too far apart for direct communication, and moreover, a car desirous of initiating a call may thus become aware of a car already transmitting oscillations even though it is unable to receive the car transmissions directly.

I claim:

1. A radio communication system comprising a main station, a relay station and a mobile station, the main station having transmitting means to transmit simultaneously oscillations at a first and a second radio frequency both of which oscillations are modulated with the same intelligence and receiving means to receive oscillations at said first and second radio frequencies, the relay station having receiving means to receive oscillations at said second radio frequency and transmitting means to transmit oscillations at said first radio frequency modulated with the received modulation, and the mobile station having transmitting means to transmit oscillations at said second radio frequency and receiving means to receive oscillations at said first radio frequency.

2. A radio communication system according to claim 1 wherein the relay station has muting means to cause the relay station transmitting means to transmit oscillations at said first radio frequency only when the oscillations received at said second radio frequency by the relay station receiving means are above a predetermined strength.

3. A radio communication system according to claim 1 wherein there is provided at least one further relay station which has receiving means to receive oscillations at said second radio frequency and transmitting means to transmit oscillations at said first radio frequency modulated with the received modulation.

4. A radio communication system according to claim 3 wherein each of said relay stations has muting means to cause the relay station transmitting means to transmit oscillations at said first radio frequency only when the oscillations received at said second radio frequency by the relay station receiving means are above a predetermined strength.

5. A radio communication system comprising a main station, a relay station and a mobile station, the main station having a pair of transmitters tuned to transmit oscillations at a first and a second radio frequency respectively, means to supply the same modulation to both transmitters, a pair of receivers tuned to receive oscillations at said first and second radio frequencies respectively, and means to combine the outputs from the two receivers, the relay station having a receiver tuned to receive oscillations at said second radio frequency and a transmitter tuned to transmit oscillations at said first radio frequency modulated with the received modulation, while the mobile station has a transmitter tuned to transmit oscillations at said second radio frequency and a receiver tuned to receive oscillations at said first radio frequency.

ALAN JOHN BAYLISS.

References Cited in the file of this patent

UNITED STATES PATENTS

| Number | Name | Date |
|---|---|---|
| 1,559,992 | Schaffer | Nov. 3, 1925 |
| 1,624,966 | Morris | Apr. 19, 1927 |
| 1,654,322 | Conrad | Dec. 27, 1927 |
| 1,754,881 | Clement | Apr. 15, 1930 |
| 1,799,976 | Falknor | Apr. 7, 1931 |
| 2,096,874 | Beers | Oct. 26, 1937 |
| 2,129,029 | Roberts | Sept. 6, 1938 |
| 2,197,516 | Case | Apr. 16, 1940 |
| 2,292,222 | Haigis | Aug. 4, 1942 |
| 2,421,017 | Deloraine | May 27, 1947 |
| 2,458,124 | Wilmotte | Jan. 4, 1949 |
| 2,487,513 | Beverage | Nov. 8, 1949 |
| 2,508,613 | Lang | May 23, 1950 |